Jan. 2, 1951 J. A. H. BARKEIJ 2,536,711
CONNECTING ROD STRUCTURE
Filed Aug. 24, 1944 11 Sheets-Sheet 1
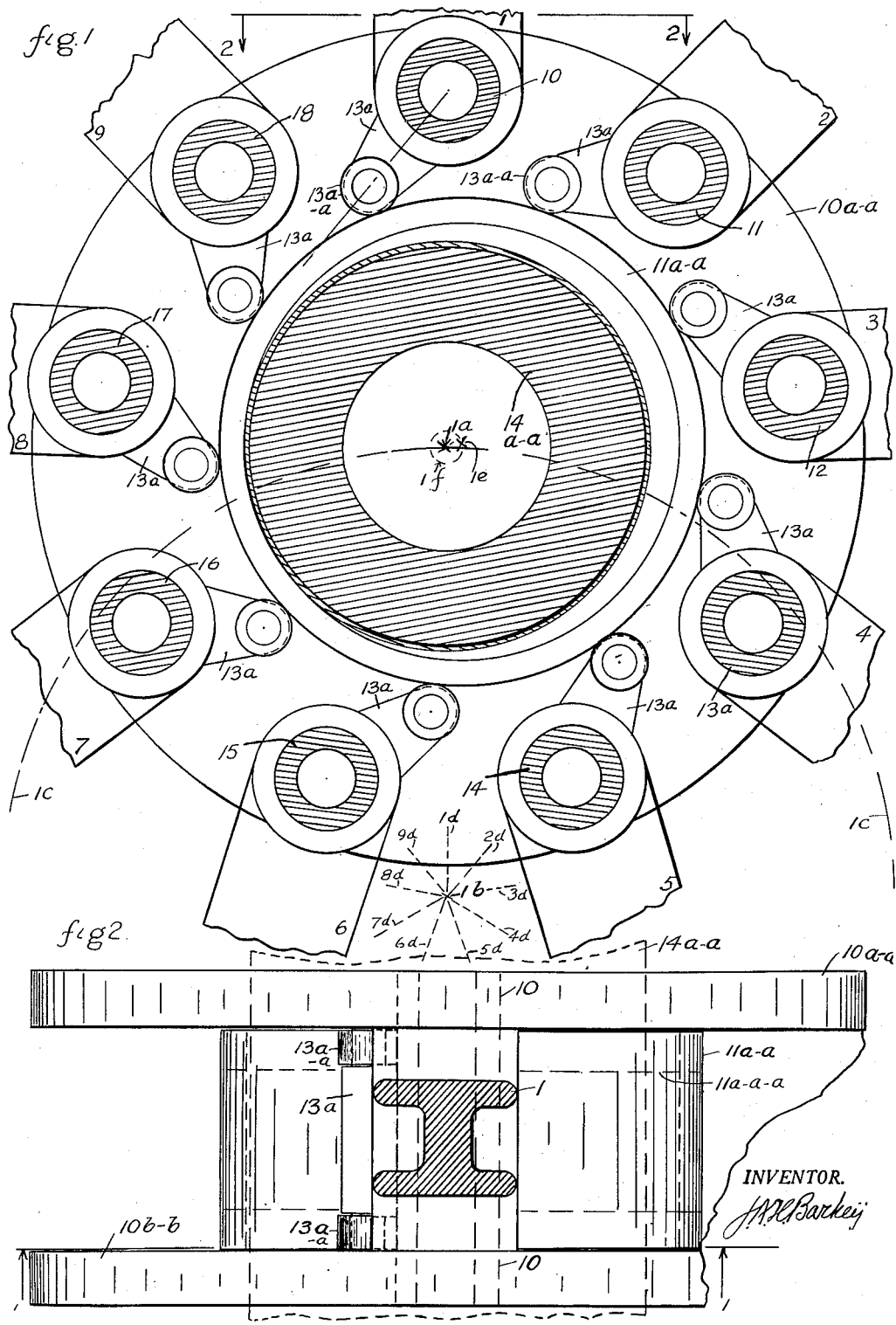
INVENTOR.
J.A.H.Barkeij

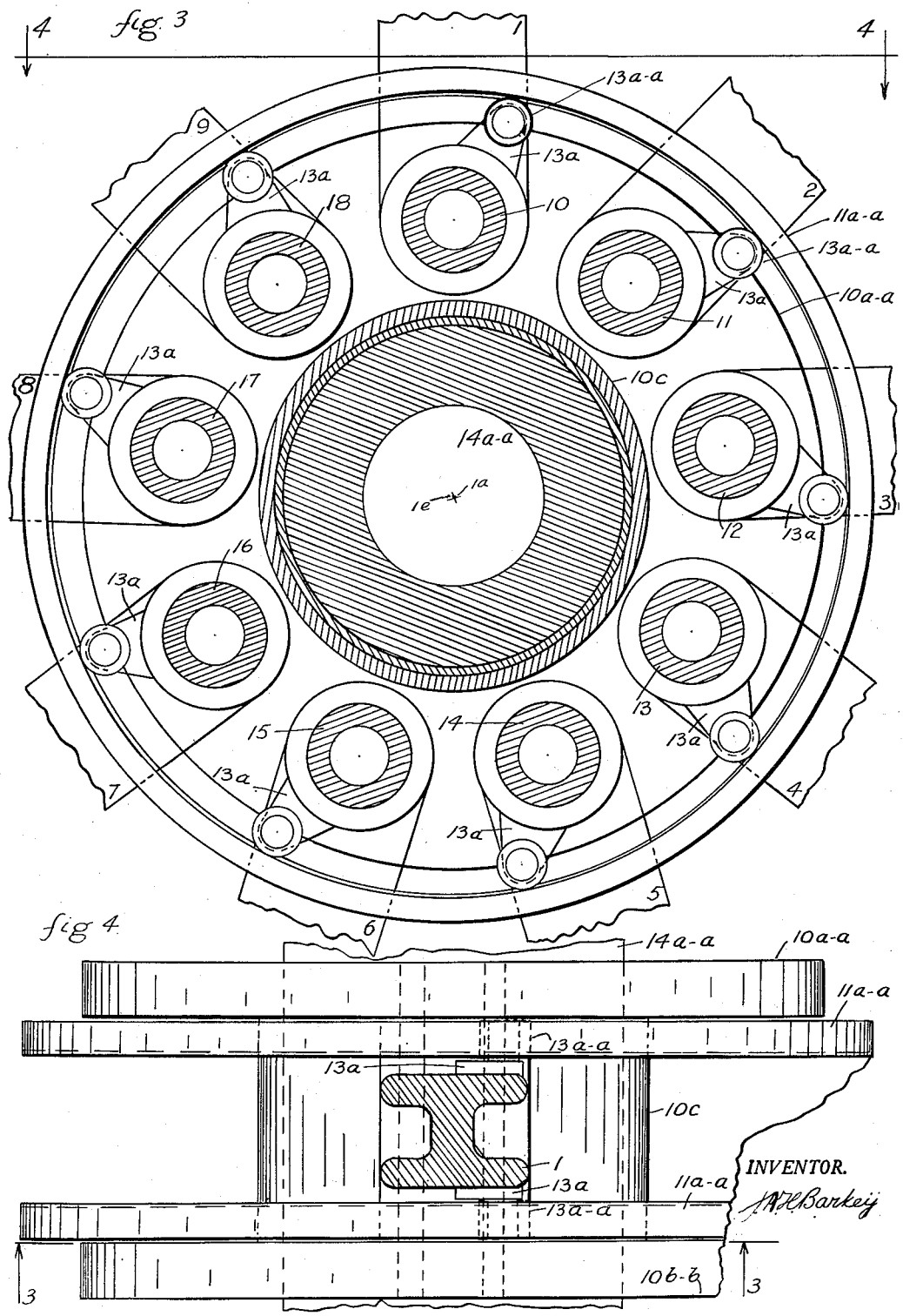

Jan. 2, 1951 J. A. H. BARKEIJ 2,536,711
CONNECTING ROD STRUCTURE
Filed Aug. 24, 1944 11 Sheets-Sheet 3
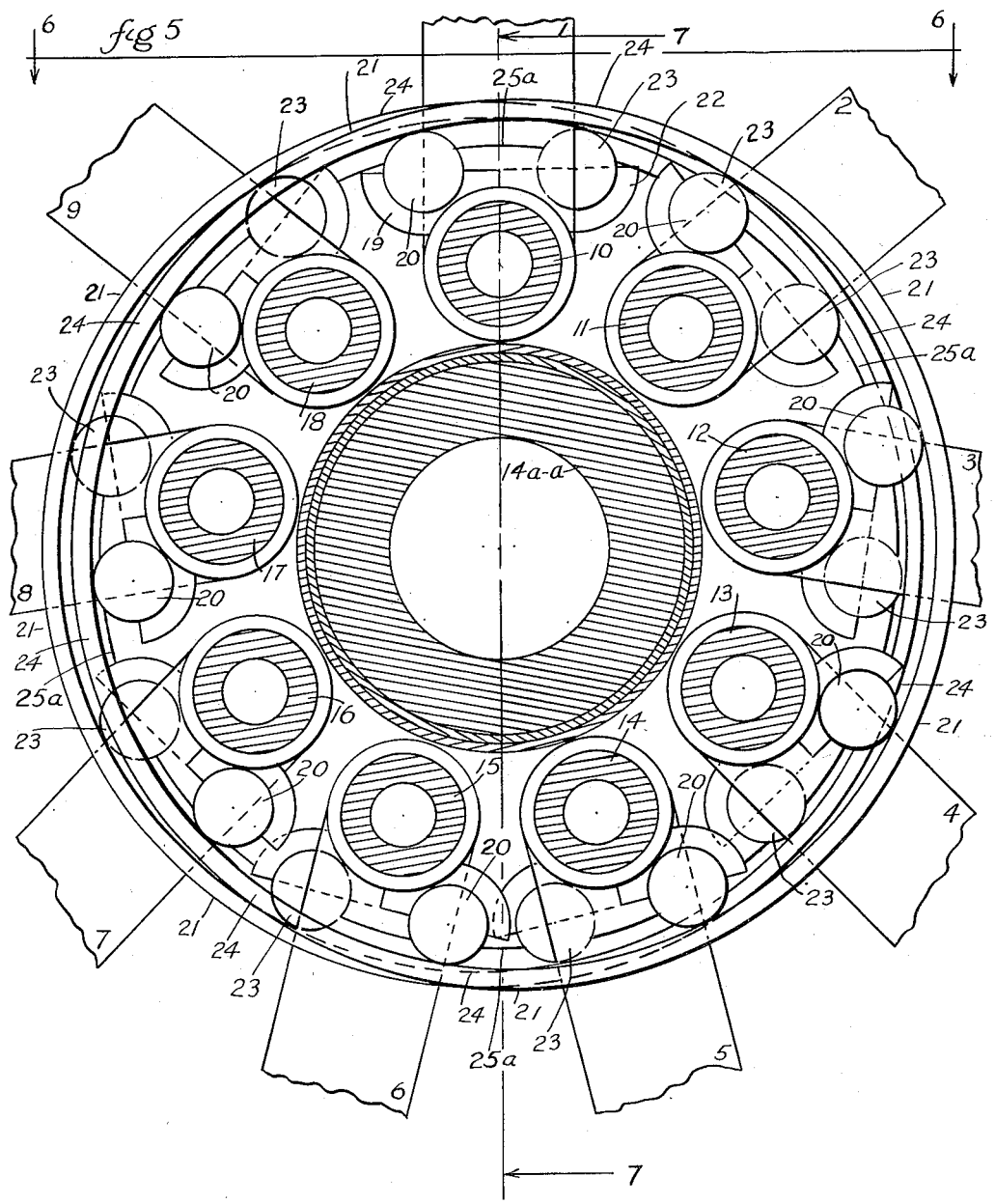
INVENTOR.
J.A.C.Barkeij
BY

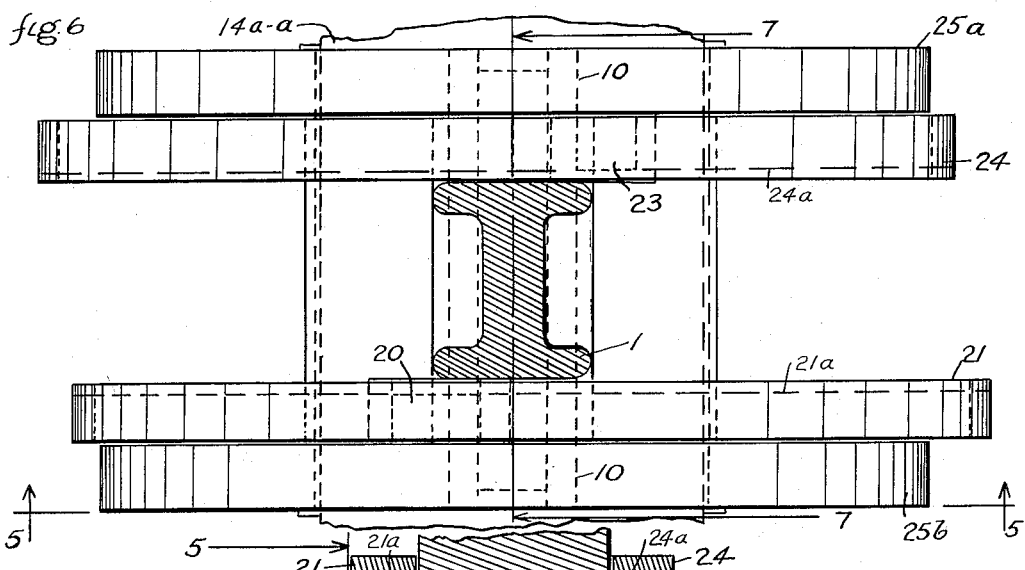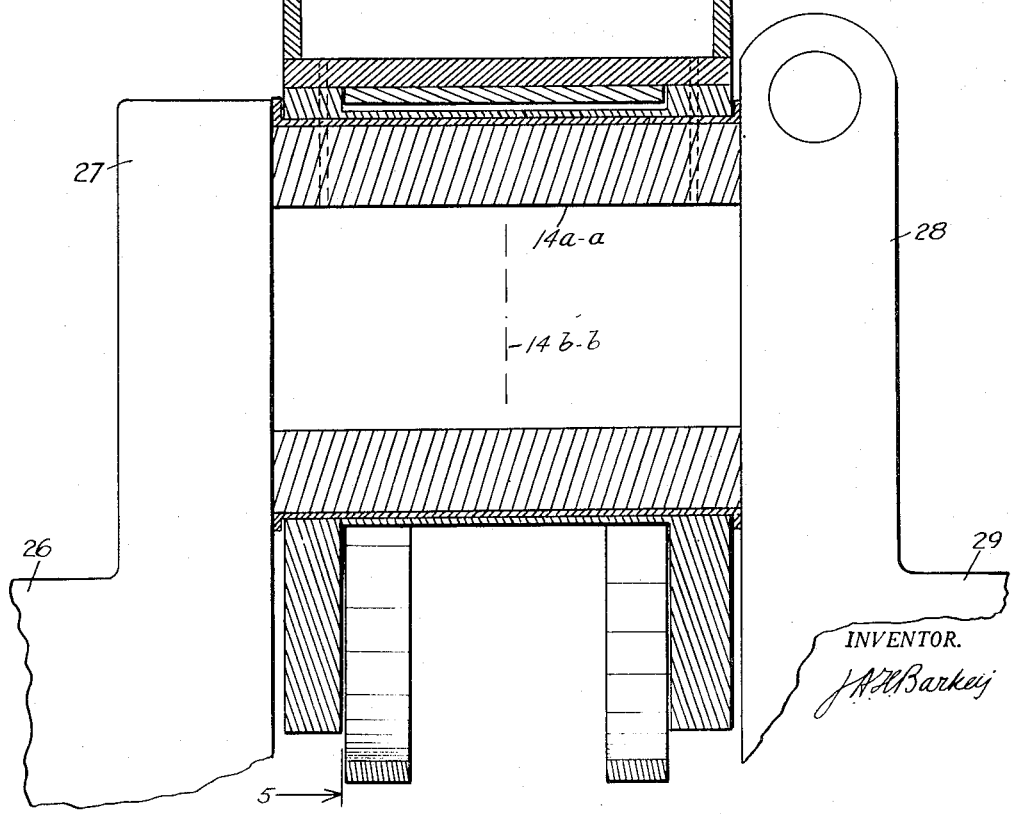

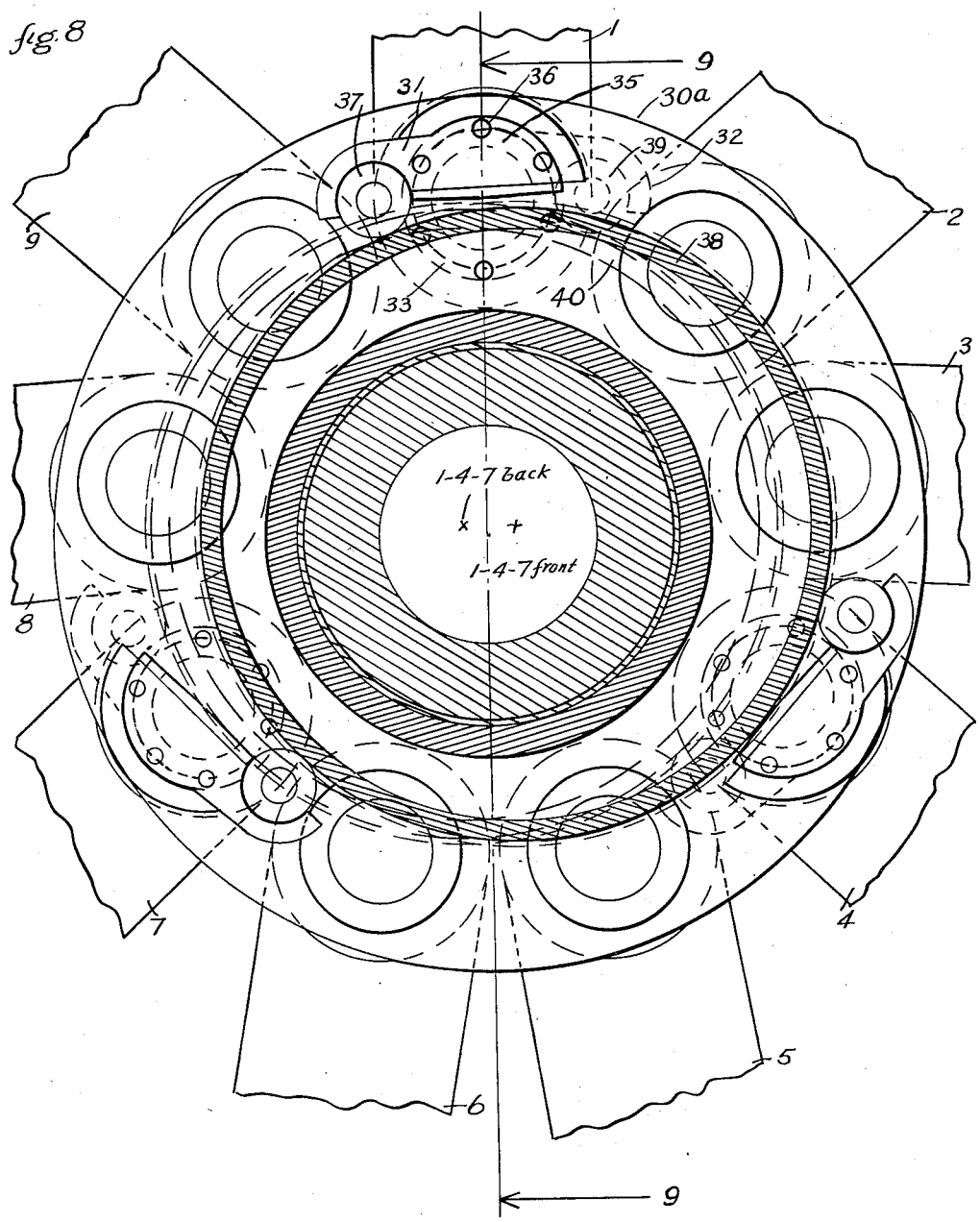

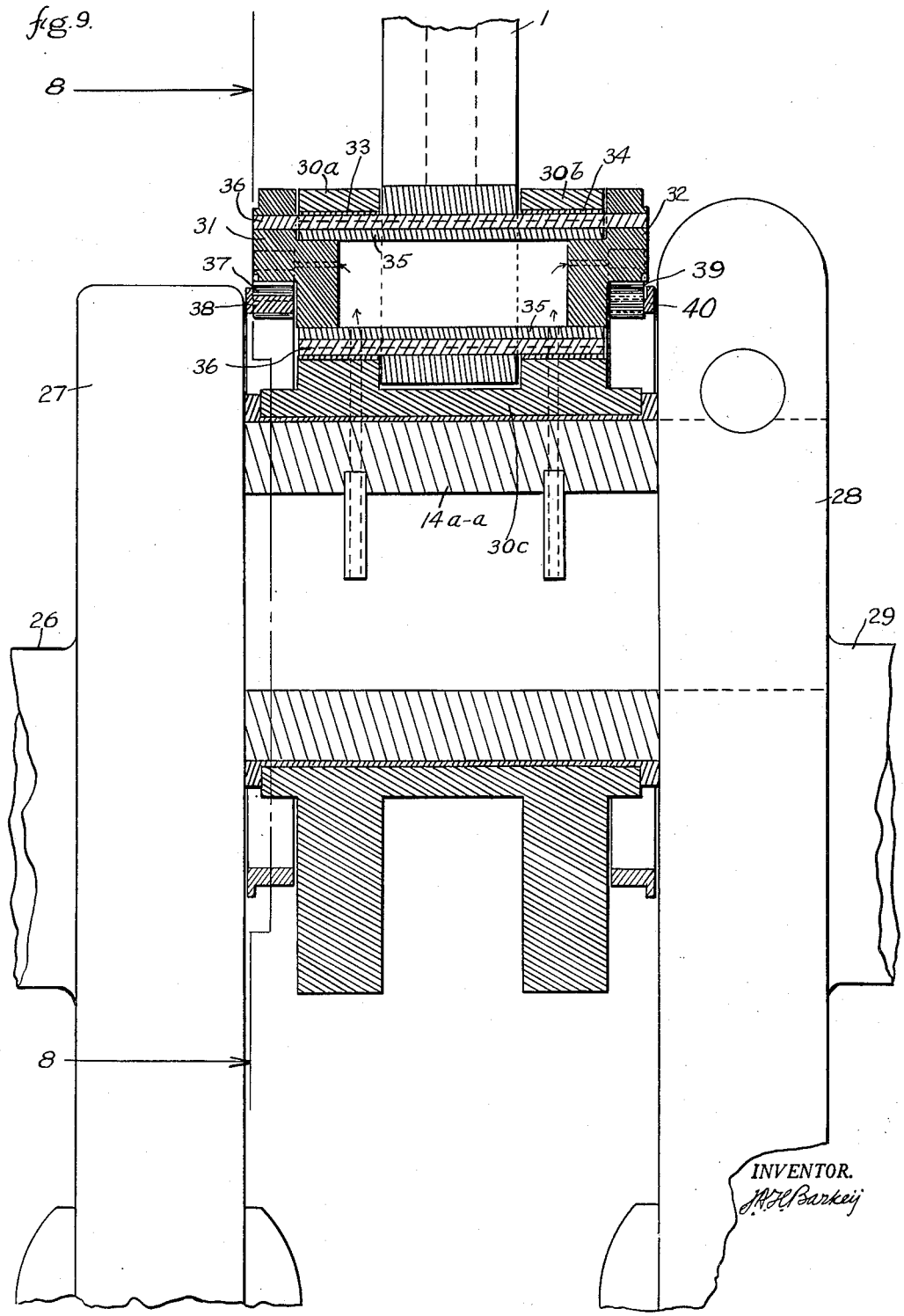

Jan. 2, 1951        J. A. H. BARKEIJ        2,536,711
CONNECTING ROD STRUCTURE
Filed Aug. 24, 1944        11 Sheets-Sheet 7
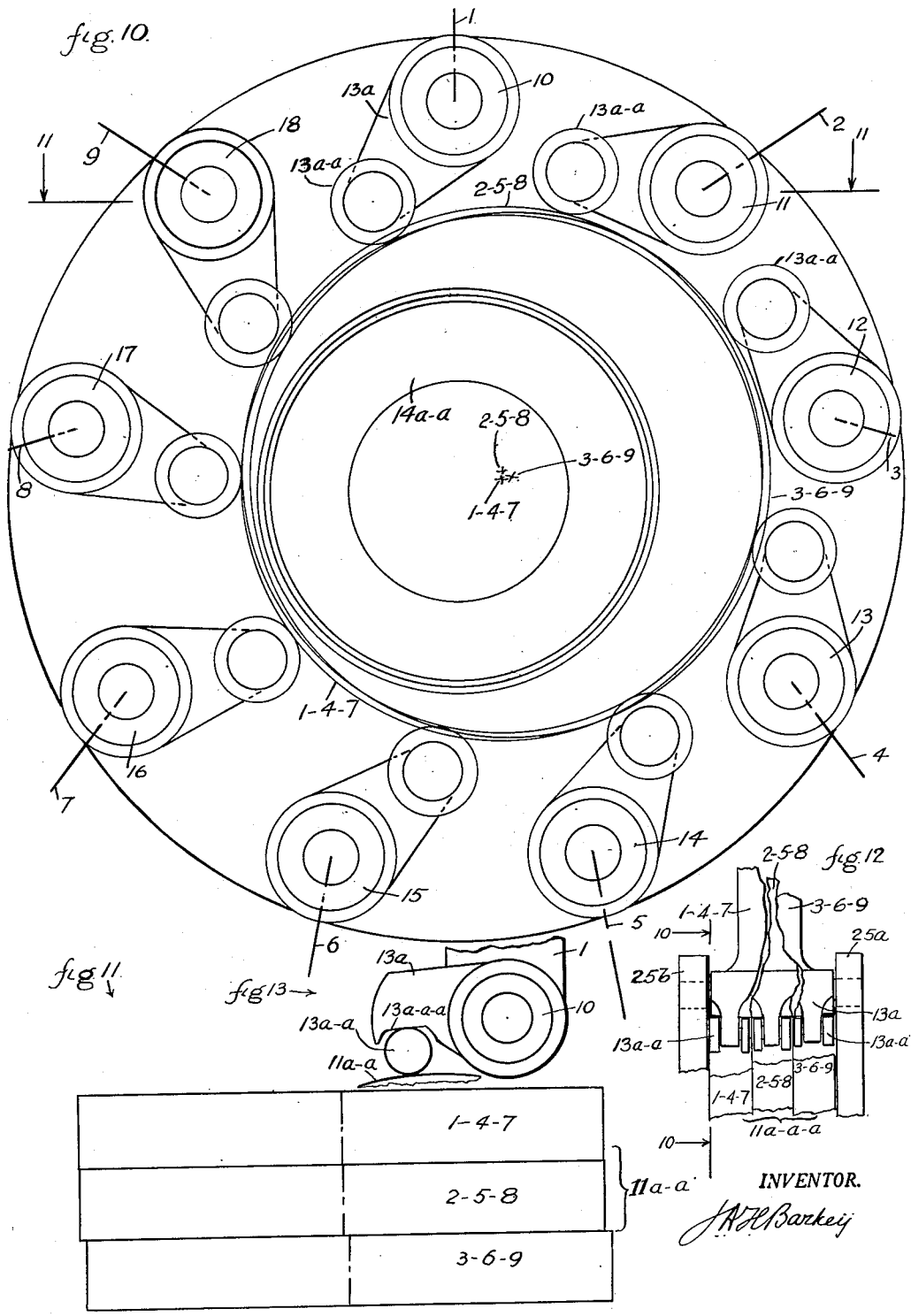

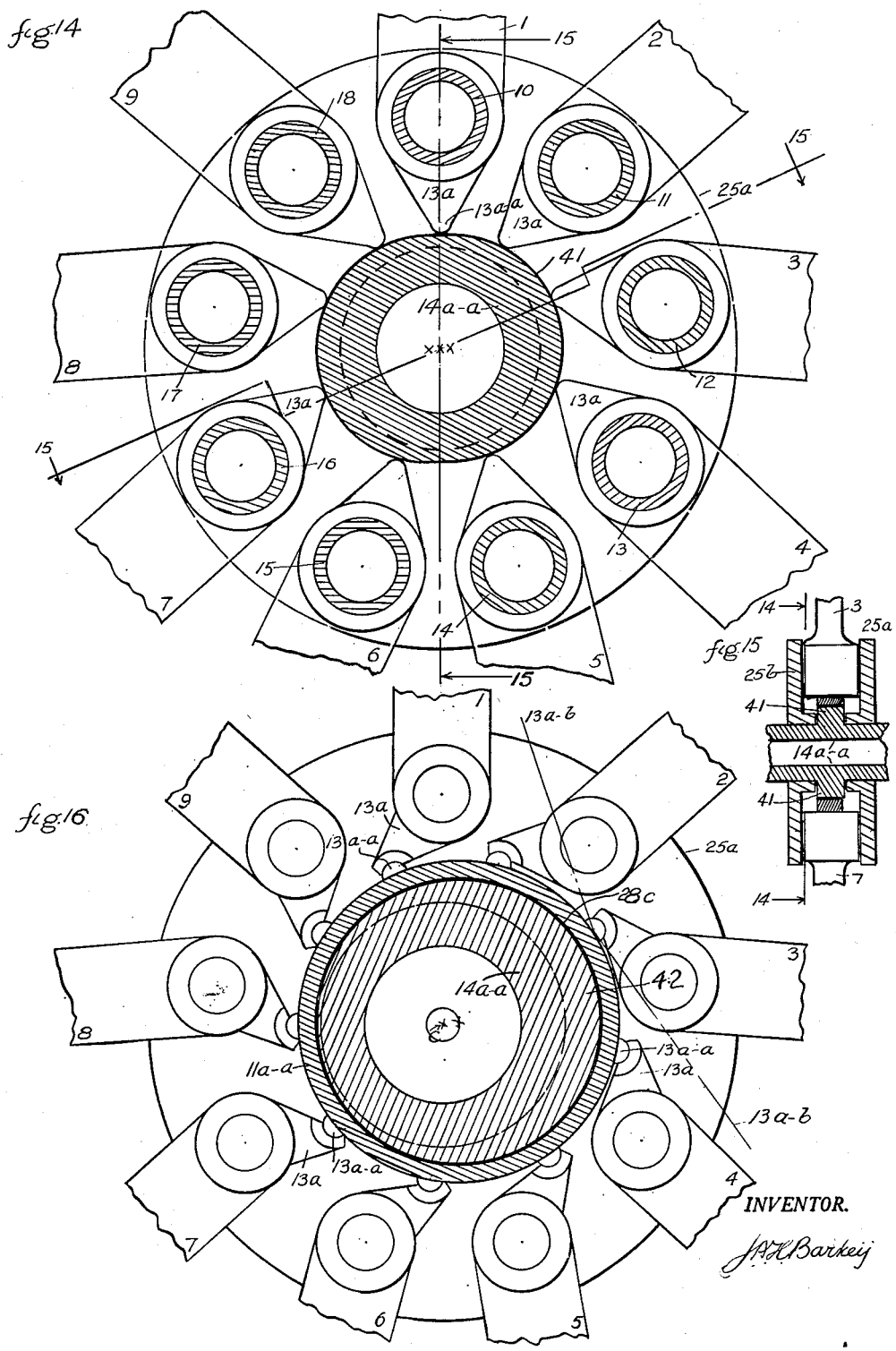

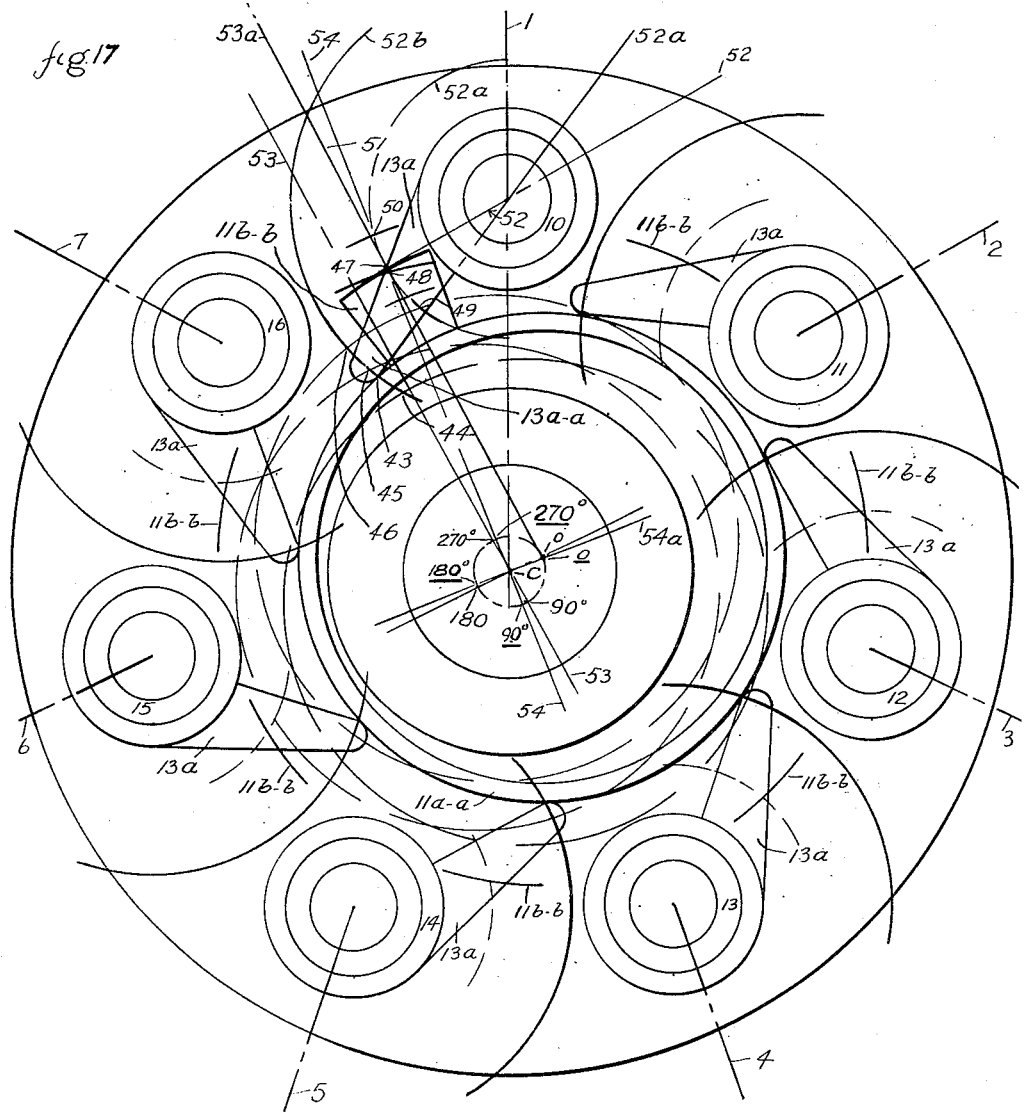

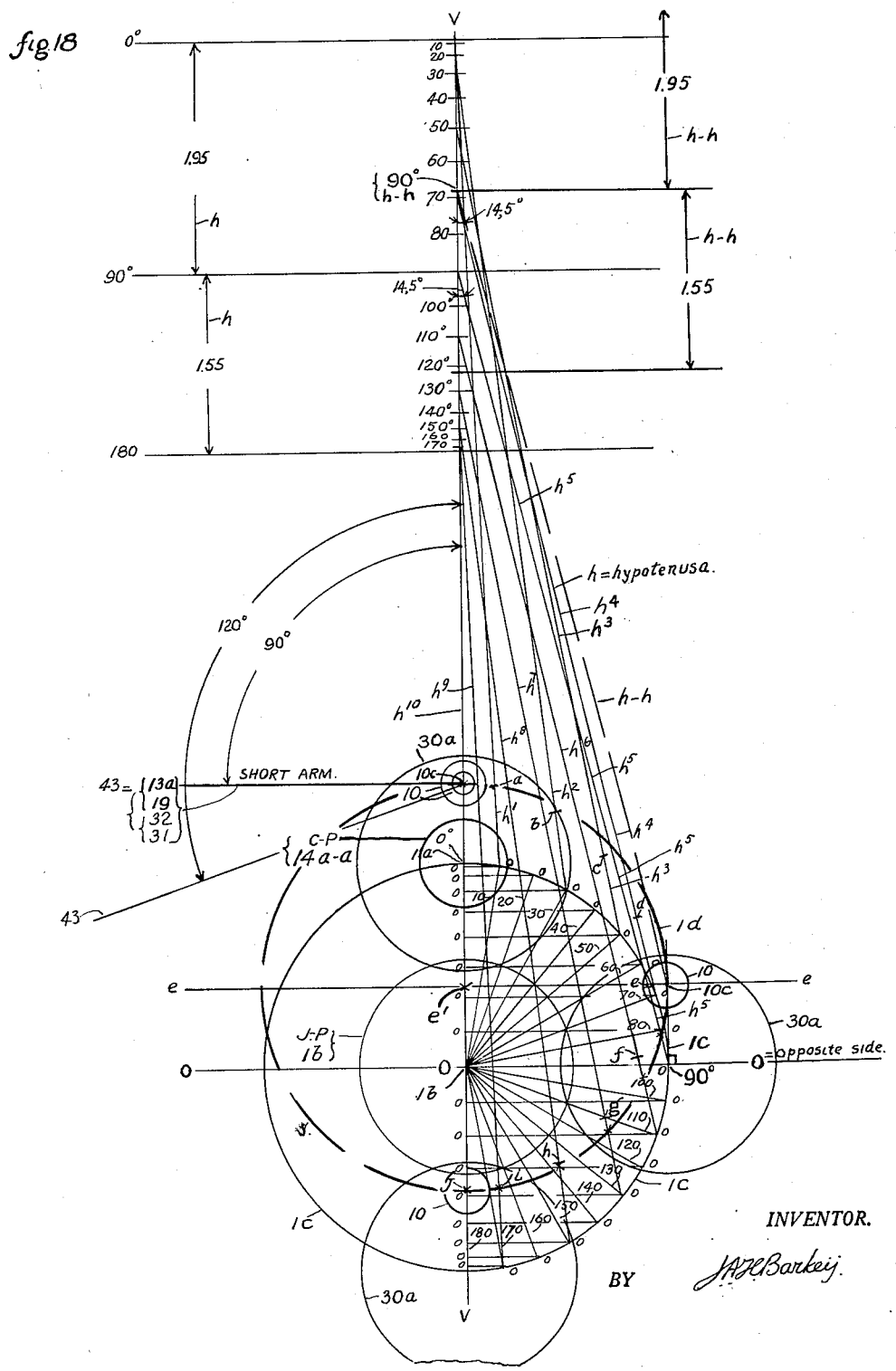

Patented Jan. 2, 1951

2,536,711

UNITED STATES PATENT OFFICE 2,536,711

CONNECTING ROD STRUCTURE

Jean A. H. Barkeij, Altadena, Calif.

Application August 24, 1944, Serial No. 550,999

20 Claims. (Cl. 74—580)

The present invention is a continuation of the principle of my prior Patent No. 2,209,014 of July 23, 1940.

The main object is to do away with the master rod structure with knuckle pins as is standard in all aviation engines.

Other objects will appear during the description of the figures.

Some of the main objects are better running balance, exactly equal firing intervals, equal stroke, and the possibility of higher average running speeds without serious vibrations, or overheating of the cylinder carrying the piston to which the master rod is attached.

Fig. 1 shows a vertical cross-section transverse of the crankpin of a crankshaft of a radial engine, and a ring mounted thereon, having pivotally arranged thereon connecting rods.

Fig. 2 shows a top view of the Figure 1.

Fig. 3 shows a vertical cross-section of a similar structure, which represents a modification and/or equivalent of that shown in Fig. 1.

Fig. 4 shows a top view of the modification of Fig. 3.

Fig. 5 shows a vertical cross-section of another similar modification, showing advantages over the two first modifications, as will be explained later on herein.

Fig. 6 is a top view of said third modification, and Fig. 7 shows Fig. 5 on the section line 5—5. Fig. 5 reversely shows Fig. 7 on the section line 7—7.

Fig. 8 shows a fourth modification in vertical cross-section, and Fig. 9 shows Fig. 8 on the cross-section line 9—9.

Fig. 10 represents a diagrammatic figure to explain certain points of the previous modifications, and Figs. 11 and 12 show diagrammatically the application of three eccentric surfaces and rollers instead of one to decrease the distortion in the ring 11a—a for engines with a great stroke and short connecting rods.

Figure 19:
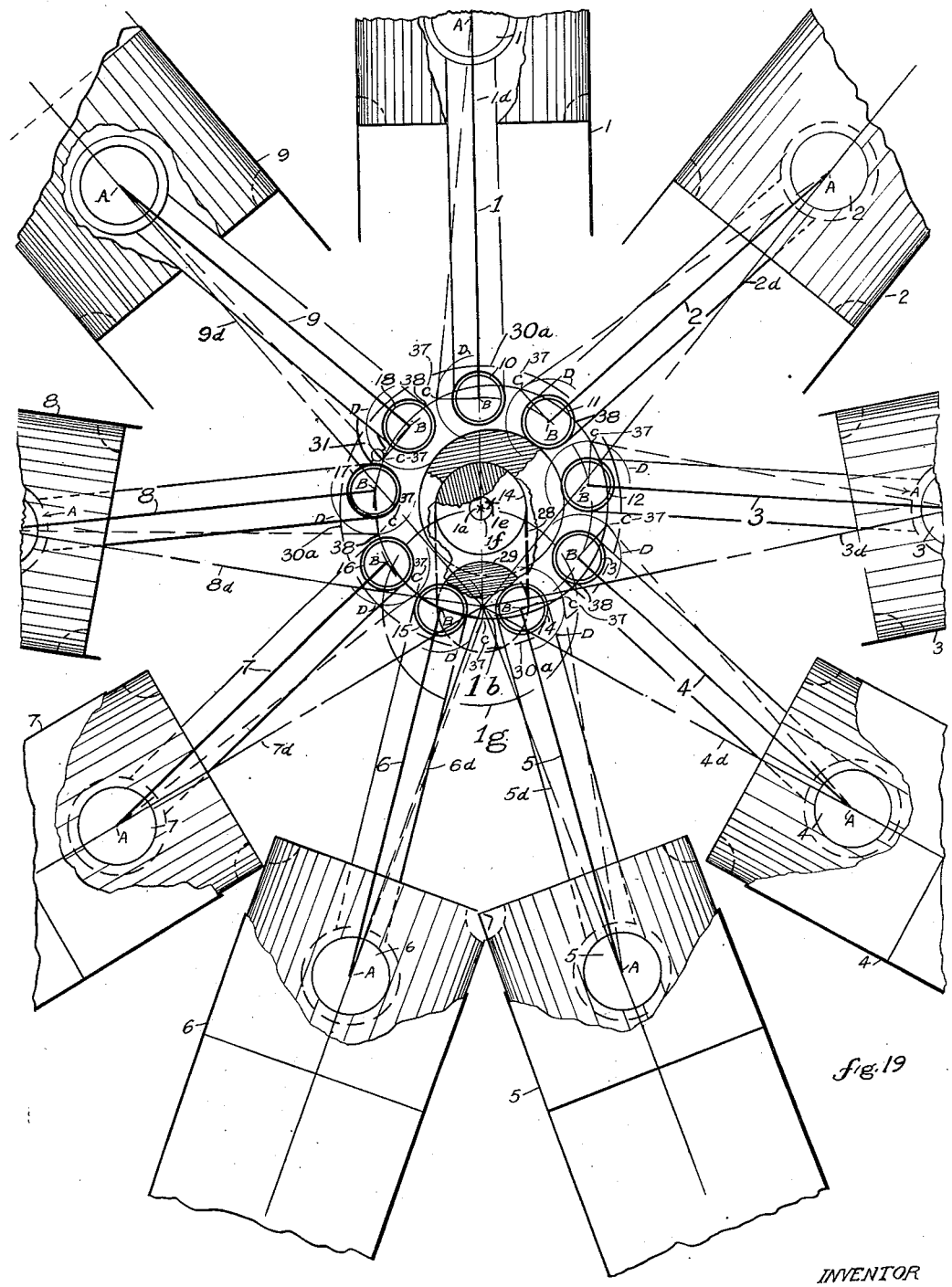

Fig. 13 shows a modification, which can be applied on the arms of any modification shown in this application. The representation in Fig. 5 shows a roller in an indention of the connecting rod, instead of a roller on a pin on the connecting rod, as shown in Figs. 1, 3, 10, 12. The Figs. 5 and 8 show rollers in indentions in the rods. The rollers in Figs. 5, 8, 16 may have play. It is understood that they are interchangeable for each other, because a roller on a pin can be given a little bit of play just as well as a roller in an indention. This matter of play is merely a matter of degree and choice. The roller is able to move back and forwards on a flat (or slightly curved) surface of the arm to compensate for very small out-of-round-form of the ring 11a—a.

Fig. 14 shows another modification, in which the crankpin is provided in the center between the two flanges, carrying the knuckle pins of the rods, with an elliptical cam (substantially elliptical anyway) and in which the rods are provided with abutments sliding over said cam, preventing thereby the rotation of the ring 25a—25b on the crankpin.

Fig. 15 shows Fig. 14 on the section line 14—14, and Fig. 15 shows reversely Fig. 14 on the section line 14—14.

Fig. 16 is another modification, in which the rods are provided in lateral direction (as in previous figures) with arms, and these arms are provided with indentions, in which can rotate rollers cut approximately in half. The ring 11a—a is forced eccentrically around in a circle, by the eccentric 42, which forms a part of the crankpin, about in the same way as the elliptical cam in Figs. 14—15 forms a part of the crankpin. As in previous modifications the rods resting with their arms or abutments on this ring, move it around anyway independently of this eccentric, but in case this ring breaks the eccentric would continue to hold this ring eccentrically for the time being until repairs can be made. If the pistons at the top of the connecting rods receive explosions, it stands to reason that the rods would tend to rotate the annular members 25a—25b, which form a unit with the pins 10 to 18, around the crankpin. However, all arms 13a on all connecting rods rest on the second annular member 11a—a, which is independent of the said first annular member 25a—25b, (may be called floating) and control the motion of circular translation of the member 11a—a around the axis of the crankpin. It stands therefore to reason that the eccentric 42 is in a way superfluous, because the angularity of all rods is reversely determined by the position of the member 11a—a. This eccentric can be omitted for either direction of rotation, because some arms move away from the member 11a—a, and others move towards it, so that the member 11a—a is forced by half of the rods against the other half, and the rod which is exactly at maximum angularity to the crankpin is excepted.

Fig. 17 shows another modification.

The ring 11a—a is provided with abutments with surfaces extending upwardly from the annular ring proper, as shown in Fig. 19. The advantage is that these abutments meet the abutments on the connecting rods in that part of the arc, in which the movement above 90° is equal to that below 90°, as will be described in detail in connection with Fig. 19.

Fig. 18 is a short mathematical and diagrammatic explanation referring to the motion of the articulated rods.

Fig. 19 shows the abutments of Fig. 17 integral with the ring $11a$—$a$ instead of loose therefrom. Fig. 19 shows a combination of the arrangement of Figs. 8 and 9, in which the arms and rollers are at 90° to the axes of the rods, and the rollers may have a little play as shown in Fig. 13.

Fig. 20 shows the arrangement of the cylinders, connecting rods, pistons, and crankshaft, and will be described in detail hereinafter.

Referring more particularly to Figs. 1 and 2, 1 to 9 are the rods pivotally arranged on two flanges $10a$—$a$ and $10b$—$b$ connected to each other to form a single ring by means of knuckle pins $10$ to $18$. Each rod has an arm $13a$, provided at the tip with two rollers $13a$—$a$. These rollers ride on a single annular ring $11a$—$a$, located between the two flanges of the connecting-rod-ring (from now on the two flanges, connected to each other in any desirable or economical way, are called the connecting-rod-ring, or shortly the rod-ring).

Fig. 2 shows Fig. 1 partly in top view, and Fig. 2 shows Fig. 1 on the section line 2—2.

When the engine rotates, the connecting rods all assume a certain angularity with respect to the rod-ring. The rod-ring is arranged on the crankpin $14a$—$a$, having its center at $1a$. This center rotates in a circular path $1c$ around the journal pin center $1b$ of a radial engine, as is well known in the art.

The arm of the rod $1$ in Fig. 1, is shown in its middle position, piston $1$ of cylinder $1$ being in top position (the axes of these cylinders are $1d$ to $9d$ extending in radial direction from the journal-pin-axis $1b$) and all the other rods are at a certain angle deviating from said middle position. The tip end of the arms $13a$ of the rod form at any time substantially a circle, deviating slightly therefrom mainly on account of the fact that the arms $13a$ are not at right angles to the axes of these rods, but are extending therefrom laterally and because the ring shifts its center from right to left. These arms, (taking the arm of rod $1$ as an example), move a certain distance from said middle position down on the next 90° downstroke of piston $1$, and the same distance back to middle position from 90° to 180° rotation of the crankshaft around center $1b$. From 180° to 270° this arm moves upwards a certain distance from this middle position, and back again the same distance from 270° to 360° rotation of the crankshaft.

During this one revolution, the center $1e$ of the annular ring $11a$—$a$ has moved along the path of a small cricle $1f$, around the center $1a$ of the crankpin $14a$—$a$.

All the other rods make the same motion during 360° from their successive top positions.

If the arms $13$ were arranged at 90° to the axes of their respective rods the centers of the rollers would form all the time a perfect circle, and such a modification will be shown later, demanding a modified structure, as shown in Figs. 8 and 9. If it is preferred to bring the member $38$ between the members $30a$ and $30b$, the connecting rods may be forked and straddle the member $38$.

The ring $11a$—$a$ has to be made of such a thickness and elasticity that this irregularity will be absorbed thereby, keeping the rods all the time under relatively a very small bending stress, which has a tendency to be equalized at all times over all rods.

In Figs. 3 and 4, I have reversed the position of the arms $13a$ and the rollers $13a$—$a$, 180°, thereby effecting certain advantages.

In the first place a greater ring absorbs the small irregularity of the position of the rollers, and in the second place the single ring $11a$—$a$ can be split into two rings $11a$—$a$, as shown in Fig. 4 (of course, the single ring $11a$—$a$ in Fig. 2 may be split into two narrow rings, as indicated at $11a$—$a$—$a$).

In Figs. 5, 6, 7, I show another modification in which I provide each rod with one arm on each side of a central plane $14b$—$b$, perpendicular to the crankpin-axis.

The left arm of the rods is indicated by $19$ having a roller $20$ in an indention, or cup, of said arm. The right arm $22$ has a roller $23$. The rollers $20$ ride on the inside of a ring $21$, and the rollers $23$ on the inside of the opposite ring $24$. This construction minimizes the stress in all the rods to a minimum, because the stress caused by the irregularity works in opposite direction, substantially, on all rods. The rollers cannot fall out of their cups, because the flanges $25a$ and $25b$ of the rod-ring restrain them. The rings $24$ and $21$ can be provided, if desired, by an internal flange $24a$ and $21a$, hooking behind the rollers so that these rings cannot slide against the rods.

In Figs. 8 and 9, I show another modification in which I construct the arms $31$ laterally at right angles to the axes of the rods $1$ to $9$.

The rods $1$ to $9$ pivot with their knuckle pins $35$ in the two flanges $30a$ and $30b$ of a rod-ring $30c$, having a bearing on the crankpin $14a$—$a$.

The knuckle pins $35$, arms $31$ and bearings $33$, $34$ are made of such dimensions and tolerances that they have a tight fit into, and over, each other.

They are assembled in the position shown in Figs. 8 and 9 on an assembly fixture, such as used for standard master rods. Six holes at 60° to each other are drilled through each of said nine sets, and six pins $36$ are driven (after cooling these pins substantially) into these holes, forming each set into a rigid unit. The bearings $33$ and $34$ form a part of these units and can be made of bronze, which rotate slightly in the two flanges of the rod-ring during rotation. The arms $31$ are provided with cups, having rollers $37$, which ride on the outside of two rings $38$ and $40$. These two rings are provided with a rim to keep the rollers $37$ in place, and the rings $38$ and $40$ are held in place by the crankarms $27$ and $28$ of the journal pins $26$ and $29$ of the crankshaft.

Only the rods $1$, $4$, $7$ are in this modification provided each with two rollers, and by this construction these rollers form at all times practically a perfect circle for the average bore and stroke to be used for a standard radial engine.

Of course, all rods can be provided with similar arms and rollers acting on the same two rings.

In Figs. 11, 12, 13 I show another modification. On account of the fact that three rods arranged at 120° form with their arms and rollers more nearly a perfect circle than 5, 7, or 9, rods, I arrange a single ring $11a$—$a$ with three surfaces, which have a slight eccentricity with respect to each other, their centers being arranged at 120° as shown in Fig. 10 (of course, these 3 rings may be separate from each other).

The rods 1, 4, 7 act on one ring, the rods 2—5—8 on another, and the rods 3—6—9 on another. Of course, the Figures 11-13 represent an exaggerated picture of the real situation for the average engine using this structure, or these structures. The axes 1 to 9 of the rods are shown at greatly increased angles, so that the rollers move over far too great an arc. The exaggeration is shown merely for purposes of illustration.

Fig. 11 shows the ring 11a—a in top view, and Fig. 12 shows diagrammatically the rods all arranged in a straight line over the corresponding surfaces of the ring 11a—a in a straight line. The rods 1—4—7 have their arms 13a and rollers 13a—a at the left end of the foot of the rods, the rods 2—5—8 in the middle, and the rods 3—6—9 at the right side, so that they cannot possibly interfere with each other.

In Fig. 13, I show that the rollers 13a—a may be arranged in contact with a flat surface 13a—a—a on the arms 13a, so that the rollers may move back and forth with relation to the axis of the fulcrums of the arms, which are the axis of the knuckle pins, or rods pivoting in the rod-ring.

It is understood that this feature of Fig. 13 may be applied on any other modification in which rollers are shown located in indentions of the short arms forming part of the connecting rods 1 to 9, and riding on a camsurface as shown in Figs. 1 to 16. It is understood that in any modification shown the arm 13a at the lower end of the connecting rods may be provided with a roller or half roller as shown in Fig. 16, for the simple reason that any point on these arms describe an arc having as center the axis of the connecting rod knuckle-pins 10 to 18 inclusive. These rollers may have play as shown in Fig. 13 or not.

In Fig. 14 I show another modification, in which the arms 13a or abutments 13a ride over a substantially elliptical surface, formed on the middle of the crankpin, as shown in Fig. 15. The rod 1, being in top-position is not restrained to move to the left or right, but the 8 others are. The disadvantage of this structure, is that the wear and tear on the tips 13a—a of the arms 13a will be too great, because these tips slide continuously over the elliptical surface 41. The arms 13a may be equally provided with rollers, as stated here above in connection with Fig. 13, and as stated at the end of the description in relation to the claims; with abutments is meant that part of the connecting rod arms, which is in contact with the camsurface, or reversely that part of the camsurface that is in contact with the connecting rod arm.

In Fig. 16, I show another modification. The eccentric ring 11a—a of Figs. 1 and 2, is arranged over an eccentric 42 forming part of the crankpin. The slight irregularity is compensated for in two ways. I arrange a slight play 28c between eccentric 42 and ring 11a—a, and the rollers 13a—a are cut about in half and provided with a surface fitting the outer surface of ring 11a—a.

In Fig. 17 I have shown another modification. The annular ring is provided with upwardly extending abutments, which have surfaces in lateral direction so that the abutments of the rods touch these surfaces at an advantageous angle, as will be explained hereinafter in connection with Fig. 19. The abutments on the rods can now move in an arch around the 90° angle, in which the movement on either side of the center position is exactly equal, as will be explained hereinafter in connection with Fig. 19.

The only disadvantage of this construction is, however, that the elasticity of the ring 11a—a becomes impaired slightly. To construct these abutments loose from this ring entails other difficulties, reason why these loose abutments do not have the merits of the other ones previously shown.

Fig 18 shows which form the camsurfaces (or ring 11a—a) have to have to get exact equal firing and an almost harmonic motion (though exactly equal stroke and equal firing intervals) for all rods and pistons.

The center 1a of the crankpin 14a—a describes a circle 1c around the center 1b of the journal pin (JP).

The axis of a standard rod on said crankpin of a length $h$ would assume the various positions $h^1$ to $h^{10}$, if the crankpin rotates clockwise at 10°, 30°, 50°, 70°, etc. position. The point 1a assumes respectively a position, which is removed the various distances 0—0 as shown for these rotations, from the vertical line $v$—$v$, which is the axis of the cylinder 1 or any other cylinder in corresponding position.

These distances increase from 0° to 90° and decrease again from 90° to 180° and exactly in the same proportions in relation to the angle travelled.

The piston however travels during the first 90° a greater distance than during the last 90°, which is indicated by the distances 1.95 and 1.55 at the left top end of the drawing.

In a radial engine, however, the rod of knuckle pin 10 has its center 10c above the center 1a of the crankpin as shown. If this center 10c rotates 90° it reaches the point e in the horizontal line e—e. The distances for point 10c are for the corresponding degrees of travel removed an equal distance from the vertical line $v$—$v$. Therefore the angularity of the knuckle pin rods is during 360° rotation the same as those of a standard rod around crankpin 14a—a, i. e. center 1a.

In Fig. 18 is shown that the short arm 13a (or 19) may have an angle to the axis of the rods of between 90° to about 120° or more, depending upon the amount of eccentricity of the camsurface.

All short arms are provided with elements or members in contact with a camsurface.

I have shown in this application 3 types, one in which only a ring, or a ring with abutments, is shown which keeps the rods in the proper angular position. (See f. i. Figs. 1 and 8.) A second type, as shown in Figs. 14 and 15 in which the abutments on the rods, or members, like rollers, on the rods, ride over a camsurface rotating with the crankpin. This camsurface may be an (substantially) elliptical surface as shown, or it may be a surface almost round and slightly elliptical, used, of course, in case the short arms 13a are at an angle between about 90 to 120° to the axis of the connecting rod from piston pin to knuckle pin.

A third type as shown in Fig. 16 has a combination of the ring 11a—a moved forcibly by an eccentric rotating with the crankpin as in the second type. In this type there are two variations, the one of Fig. 16 in which a slight space or play is left between the ring 11a—a and the camsurface 42 and the type of Fig. 19 in which such play is superfluous as explained herein for Figs. 17, 18 and 19.

In the appended claims the rod-ring is sometimes called a bearing-hub.

Each figure has a plane of symmetry through the axis of the crankpin and connecting rod structure thereon, and another plane of symmetry perpendicular to said crankpin-axis through the axis of all rods. The first plane of symmetry is called the-plane-of-axis-symmetry, the second plane the-plane-of-perpendicular-to-axis-symmetry in the appended claims, or shortly respectively the first and second plane of symmetry respectively.

For the purpose of making generic claims, the abutments, arms with rollers and variations thereof shown and discussed, are called generically abutments in the appended claims, and the annular surface in contact therewith an annular ring, or just "a ring."

While back-firing of the engine, and rotation in opposite direction would not affect any of the structures shown, it is believed that the structures with arms or abutments extending in opposite direction laterally from the axis of the rods are preferable. This feature is clearly applicable on any of the other modifications with alterations that suggest themselves.

It is understood that any of the present modifications may be applied on a plurality of crankpins of a radial engine, having two or more rows of radially arranged cylinders.

In Fig. 17 is shown that if the arms 13a are shown at the angle of line 52a with the axis one of the connecting rod 1, that the tip 13a—a touches the ring 11a at the point 43', and that 90° further it touches the point 44', and 180° further the point 45', and 270° further the point 46'. It is clear that the points 43 and 45 are not midway the points 43 and 44.

If the arms 13a are constructed at the angle of line 52 to the axis of the rods, and the center of the ring 11a—a is on the line 53a which is normal to the line 52, the similar points 47, 48 are not yet exactly midway the similar points 50 and 49.

If the axis of the arms 13a are placed on the line 52 and the center of the ring 11a is on the line 53, the equivalent points 47, 48 will fall practically exactly between the similar points 50 and 49. The points 47, 48 are determined from the points 0° and 180° underlined, and the points 50 and 49 from the points 270° and 90° respectively underlined. These underlined points are on the arc of eccentricity of the ring 11a—a around the center C.

Fig. 19 shows the abutments as forming part of the ring 11a—a. The abutments make this annular ring for a nine cylinder engine a nonagon, for a seven cylinder a heptagon, and for a five cylinder a pentagon. The eccentric camsurface 42 is a pure circle and moves the ring 11a—a up and down, and sideways, the exact amount required by angularity of the rods so that the abutments (or rollers, or half rollers, as shown in Fig. 16) stay practically exactly in contact with the abutments.

In this figure the high position of the half roller (or whole roller as desired. The half roller as shown in Fig. 16 is chosen to get greater bearing surfaces, of course) is in the plane 43H, the middle position in the plane 43M, and the low position in the plane 43L. The change in angularity in either direction of the short arm and roller 37 from middle position (when the piston is either in top or bottom position, that is at 0° or 180° in the path 1c of the center 1a of the crankpin 14a—a, or 10c, of the knuckle pin as shown in Fig. 18) is the same. The eccentric 42 lifts the ring 11a—a with its abutments a similar amount because the eccentric 42 lifts the surfaces of the ring 11a—a amounts, which correspond practically exactly with the amounts the abutments or rollers (or half rollers) on the short arms of the rods are lifted.

It stands to reason that the eccentric 42, as in Fig. 16, may be omitted and only the ring 11a—a is used, as shown for Figs. 1 and 3, 5, 8, 10 is shown.

The plane 43 is perpendicular to the plane 44, and 44 is perpendicular to plane 45. Plane 45 goes through the axis of the crankpin and the center of the eccentric camsurface 42, when it is located at point 1e in Fig. 1 and other drawings. It stands to reason that in that position the eccentricity of camsurface 42 is equal to the arc of the point of contact of the roller with the abutment on the ring 11a—a when the piston moves from 0° to 90°, from 90° to 180°, from 180° to 270°, from 270° to 360°.

In Fig. 19, I have shown diagrammatically a nine cylinder radial engine, having cylinders arranged at 40° interval around the center point 1b, which is the axis of the crankshaft. The crankpin 14 is attached to the crank-journal 29 by crankarm 28. The center of crankpin 14 is 1a, which describes the circle 1g around the center 1b of the crank-journal 29. The center 1b is the longitudinal axis of the engine, see at one end thereof as a point.

The knuckle pins 10 to 18 are arranged radially around the center 1a at equal distances therefrom, on the crankpin 14 on a member 30a (and 30b) shown in Figs. 8 and 9.

If the connecting rod of the piston of Fig. 1 is in vertical position, as shown in Fig. 20, the axis of the connecting rod is coinciding with the axis 1d of cylinder 1, or anyway parallel therewith. The other rods 2 to 9 have a certain angle to the axes 2d to 9d of the cylinders, in a plane perpendicular to the axis of the crankpin, and going through the axes of all 9 cylinders (which is the plane of the paper).

The distance of piston pin axis A, to the axis of the knuckle pin B, is A—B. The point (in fact line) of tangency of each roller 37 of Figs. 8–9 is indicated by the point C, and the distance from this point of tangency to the axis of the knuckle pin is C—B. All c's are the points of tangency of the rollers 37 with surface 36 in Fig. 19 (representing the essence of Figs. 8–9 with cylinders).

The point A describes a linear movement equal to the diameter of the circle 1b, and each of the axes of the knuckle pins 10 to 18 describe a pure circle, if all connecting rods and pistons have a true-motion connecting rod system, in which each rod has the same angular motion. All points between point A and C, describe in said true motion, an elliptical path having a major axis in the lines 1d to 9d. All points C of the rollers 37 of Figs. 8–9 have a true, or pure, circular movement. These points of tangency C are all shown on the member 30, which describes a circular motion of translation around the center 1a of the crankpin 14, and indicated by the small circle 1f around point 1a. The center of this member 38 is located at 1e in the circle 1f. (The minor axes of the ellipses described by points between points A and C, is at 90° to 1d to 9d.)

As each point C describes part of a circular path D around the axis or center of each respective knuckle pin 10 to 18, it stands to reason that the distance of this motion above and below the point C is equal to the radius of the circle 1f, and the total motion of the point C equal to the diameter of the circle 1f. I have shown only one rod 9 with an arm 31 and roller 37 in contact with second member 38.

It is obvious that this arrangement differs fundamentally from any of the arrangements shown in my prior Patent No. 2,209,014 of July 23, 1940, in that the member 11a of Fig. 4, and member 11 of Fig. 1 of said patent, is arranged in the first place concentrically with the axis of the crankpin 10, and in the second place it has no circular motion of translation around the center of the crankpin. Furthermore the rods or abutments on the rods are not in constant contact with 11 or 11a.

All appended claims containing this circular motion of translation can therefore not read on, or contain, any of the modifications of my prior Patent No. 2,209,014. The longitudinal axis of the engine is the axis 1b of the crank journal in Fig. 20, and in the small figure between rods 5 and 6 of Fig. 1.

In the appended claims the member to which the connected rods 1 to 9 are attached by means of the knuckle pins 10 to 18 is called the first member journaled on said crankpin 14. The member 38 on which the rollers 37 rest is called the second member. The third member Figs. 8–9 is 40 for rollers 39, but this member is not shown in Fig. 20.

The motion of translation, or circular motion of translation of this second member around the crankpin 14, refers to the circular motion 1f in Fig. 20, or the circle 1f in Fig. 20. This motion can only be indicated by a circle on the Fig. 19, because all parts of 38 make that motion.

It is obvious from Figs. 8–9 and 19, that if it is preferred to bring the second member 38 inside the members 30a and 30b, that the connecting rods should be forked at their lower end to provide space for the ring 38. The knuckle pins 10 to 18 are then attached solidly to the arms of this fork or the fork for the member 38 may be made so deep in the connecting rods that the ring 38 may move above the knuckle pin (10 to 18) fixed solidly to the members 30a and 30b, and ring 38 makes its circular motion of translation around the crankpin 14 between these knuckle pins and the top of the fork, or slit, in the connecting rods.

It stands to reason that if the second member 38 in Figs. 8 and 19, formed a fixed part of the crankpin, like the elliptical surface 41 on the crankpin 14a—a of Fig. 14, and the abutments or arms on the rods were in constant contact therewith, that the rods would co-operate with this surface to prevent the first member (on which said rods are pivoted) from rotating on the crankpin. Or such a surface, if circular, can be placed under the floating ring 38, as shown by eccentric 42 below ring 11a—a in Fig. 16 which is strictly not floating any more. The circular surface of ring 38 approaches gradually the elliptical form of Fig. 14 the greater the angle is between the point of tangency (between rod and surface) and the axis of the knuckle pins and axes of rods.

It is further to be noted that if all points above the knuckle pins 10 to 18 describe ellipses of which the major axis is located in the plane of the axes of the cylinders (or parallel thereto), that all points below said knuckle pins describe ellipses of which the minor axis is located in the plane of the axes of the cylinders.

It is further stated that any point i. e. all points at a given distance above or below the axes of said knuckle pin, and especially if located in a plurality of planes through the longitudinal axes of the connecting rods from the wristpins (for the pistons) to the axes of the knuckle pins, and perpendicular to the single plane through the axes of all cylinders, all have a common center eccentric to the axis of the crankshaft. In other words it is always possible to draw nine lines from an eccentric point (eccentric to crankshaft axis) at 40° intervals (for a nine cylinder radial engine) and these lines will always pass through a point, i. e. axis, perpendicular to the longitudinal axis of the connecting rods, said points being further located between the axis of the wristpins and the axis of the knuckle pins of said rods. Or located below said latter axes. Therefore an eccentric can be used for many variations.

Therefore this applicant lays claim to any member located on an eccentric around the axis of the crankshaft, which member is given a circular motion of translation by said eccentric, and said member cooperating by means of constant contact and co-operation (which may include a sliding operation, of course) with said rods to prevent the spool-member, on which said connecting rods are pivoted by means of knuckle pins (called the spool-member) also in claims) from rotating on said crankpin.

The Steiner patent, made of record, does not use any eccentric located on the crankshaft around the axis thereof, but a plurality of connecting links between the spool-member and a floating member 56, which may impart to a member also a circular motion of translation. However, this plurality of links is bound to make any such circular motion of translation too delicate, and this applicant lays therefore claim especially to an eccentric located on the crank shaft itself (not on the rods, or associated with the rods, or operatively associated with the spool-member on which said connecting rods are pivoted). Said eccentric on said crankshaft moving a member, located thereon, with a circular motion of translation, which motion and member, by means of elements between said member and said rods, prevent the spool-member from rotating on the crankpin.

A great variety of elements between said rods and said member on said eccentric on said crankshaft, may prevent said spool-member from rotating on the crankpin of said crankshaft.

The axis of ring 11a—a, in Figs. 1 and 2, the axis of rings 11a—a and 11a—a, in Figs. 3 and 4, the axis of the rings 21 and 24 in Figs. 5 and 6, the axes of the rings 38 and 40 in Figs. 8 and 9, the axes of the rings, three, 11a—a—a for rods 1, 4, 7 and 2, 5, 8, and 3, 6, 9) in Figs. 10, 11, 12, 13, the axis of the ring 11a—a in Figs. 16 and 17, if mentioned in the appended claims have an axis parallel to the axis of the crankpin 14a—a in all these figures. These axes are furthermore parallel to the cylindrical surface of these rings.

The elliptical ring 41 on crankpin 14a—a has two foci, and the axes of these foci are also parallel to the axis of the crankpin 14a—a, and, of course, parallel to the surface of the elliptical ring.

In the following claims is stated that the axes of these rings describe around the axis of this crankpin, circular motions of translation. That means the said first axis of said rings actually rotates around said second axis of said crankpin, but the ring itself does not rotate around the crankpin proper (although actually the axis of the crankpin does rotate within these rings, because this latter axis is a part of the crankpin. Furthermore the ring itself describes a circle around the longitudinal axis of the crankshaft by means of the throw of the crankshaft (that is axis of the crankshaft journals) so that the motion of the latter circle combines with its former described circular motion of translation around the crankpin, (or crankpin-axis) so that each point on the periphery of these rings describe circles having a diameter equal to the stroke of the crankshaft (i. e. twice the distance from axis of crankpin to axis of crankshaft-journals) plus the diameter of said circle of translation.

In any of these arrangements the member 10a—a on which the connecting rods are pivoted (10a—a in Fig. 1 and the rest) cannot rotate in either direction, clockwise or counterclockwise, by the fact that said rings 11a—a and connecting rods pivoted on ring 10a—a, co-operate with each other at all times. If two of such rings are used as in Figs. 8-9 (see Fig. 20 also) the stresses in the rods are appreciably reduced, but the double arrangement is not made to prevent counterclockwise rotation of ring 10a—a on the crankpin 14a—a in case during starting a counter-explosion will rotate the engine in opposite direction.

The distinguishing feature of the present constructions over each of the features and constructions of my prior Patent 2,209,014 is that each point on the member 11 in Fig. 1, or 11a in Fig. 4, thereof describe circles during rotation of the engine which are equal to the circles described by the axis of the crankpin thereof. Each point on my member 11a—a herein describes a greater circle.

I claim:

1. A connecting rod assembly for a crankshaft of an engine, having a crankpin, an annular member journaled on said crankpin, a plurality of connecting rods pivotally connected by knuckle pins to said member, and means for preventing rotation of said first member about the axis of said crankpin by means of a camsurface or second member in constant contact with said rods at a point removed from the axes of said knuckle pins, said second member having a cylindrical surface, having an axis parallel to said surface, and parallel to the axis of said crankpin, said first axis describing a circle around said second axis during rotation of said engine, said rods attached to pistons reciprocating in cylinders, said rods and first member, as a unit, being limited to predetermined motions by said pistons and said second member in contact with said rods, and imparting to said second member a circular motion of translation, said pistons receiving impulses during rotation of said engine, said circular motion of translation being around the axis of said crankpin.

2. A connecting rod structure, having a plurality of connecting rods pivoted on a member journaled on a crankpin of a crankshaft, pistons connected to the top end of said rods and reciprocating in cylinders arranged radially with respect to the axis of said crankshaft, said rods being in contact at their lower ends by means of abutments with a second member around said crankpin, said second member having a cylindrical surface and an axis parallel to said surface, and parallel to the axis of said crankpin, said pistons, rods, first member, and second member, preventing in co-operation with each other, the rotation of said first member on said crankpin, during rotation of said crankshaft, said second member receiving a circular motion of translation around the axis of said crankpin by impulses on said pistons and by the rotation of said crankshaft so that each point on the periphery of said second member describes during rotion of said engine, a circle which is greater than the circle described by the axis of said crankpin around the axis of said crankshaft.

3. A connecting rod assembly, for a crankshaft of a radial engine, having a crankpin, an annular member journaled on said crankpin, a plurality of connecting rods pivotally connected by knuckle pins to said member, pistons connected to the top end of said rods reciprocating in cylinders, and means of preventing rotation of said first member about the axis of said crankpin by means of a camsurface forming a unit with said crankpin, said elliptical shape having two foci, which rotate around the axis of said crankpin during rotation of said engine, each point on the periphery of said elliptical surface describing a circle greater than that described by the axis of said crankpin, said rods having abutments at their lower ends resting upon said camsurface, said camsurface, first member and rods, and pistons, together with the rotation of said crankshaft effected by impulses on said pistons, cooperating with each other to prevent the rotation of said first annular member on said crankpin.

4. A connecting rod assembly for a radial engine, comprising the following elements, a crankshaft with a crankpin and two journal pins, the axes of which are parallel to the axis of the crankpin, and further are in the longitudinal direction of the longitudinal axis of the engine, a first annular member journaled on said crankpin, a plurality of rods pivoted on said member by means of knuckle pins, having axes parallel to the axis of said crankpin and journal pins, unless they are in top or bottom-position in which case the axes of crankpin and knuckle pin are in the same plane with the axis of said crankpin and the axes of said journal pins, said rods having at their top-ends pistons reciprocating in cylinders radially arranged around the axes of said journal pins, said pistons receiving impulses on the top thereof, said rods having abutments at their lower ends, said abutments being in contact with a second member around said crankpin, said second member having an axis parallel to the axis of the crankpin, and the longitudinal axis of the engine, said pistons, rods, abutments, first member, second member, cooperating with each other to prevent rotation of said first member on said crankpin and said axis of said second member describing a circle around said axis of said crankshaft, so that during rotation of said engine, each point on the periphery of said second member describes a circle during rotation of said engine, the diameter of which is greater than the stroke of said pistons connected to said first member journaled on said crankpin.

5. The combination of claim 4, in which I provide another member, similar to said second member and located on the other side of a plane through the axes of all connecting rods around said crankpin.

6. A crankshaft and a crankpin thereon in a radial engine, a ring rotatably fixed on said crankpin, a plurality of rods pivoted on said ring, said rods provided with arms at the lower end thereof, said arms carrying abutments in constant contact with a floating ring around said crankpin, said rods and abutments imparting to said floating ring a circular movement of translation around said crankpin, and said floating ring preventing thereby the rotation of said first ring around the crankpin during the operation of said engine and each point on said floating ring describing a circle during rotation of said engine the diameter of which is greater than the stroke of each point on said rods, or greater than the circle, or major axis, or stroke described by any point on said rods.

7. A crankshaft and a crankpin thereon in a radial engine, a rotatable member on said crankpin, a plurality of knuckle pins on said member, rods connected to said knuckle pins and provided with arms in operative association and constant contact with a second member around said crankpin to prevent rotation of said first member during operation of said engine, said second member executing a circular motion of translation during operation of said engine so that each point on said second member describes during rotation of that engine a circle, the diameter of which exceeds the diameter of the circle described by the axes of any knuckle pin on said first member.

8. A crankshaft and a crankpin thereon in a radial engine, a member on said crankpin, a plurality of connecting rods pivoted on said member, arms on said rods in constant contact with a surface on an element around said crankpin, the co-operative action between said arms and surface preventing said first member from rotating around said crankpin, each point on said surface describing during rotation of said engine, a circle, the diameter of which exceeds the diameter of the circle described by the axis of said crankpin.

9. In a radial engine, a crankshaft with a crankpin, a rotatable member on said crankpin, a plurality of rods pivoted on pins on said members, arms on said rods in constant contact with an element having a surface around and remote from the surface of said crankpin, said surface and arms co-operating with each other to prevent the rotation of said member on said crankpin each point on said surface describing a circle around the axis of said crankshaft during rotation of said engine which is greater or larger than the circle described by the axis of said crankpin.

10. The combination of claim 9, in which said surface is a circular ring floating around said crankpin, the point of contact of said arms with said surface being located substantially at 90° to the axis of said rods.

11. The combination of claim 9, in which said element is a circular ring around said crankpin, the point of contact of said arms with said surface being located substantially at 90° to the axis of said rods.

12. In a radial engine, a crankshaft with a crankpin, a rotatable spool-member on said crankpin, a plurality of connecting rods pivoted on pins on said member, elements on said rods in operative association with a member on an eccentric around said crankpin and fixed to said crankshaft so that it rotates with said crankshaft and imparts a circular motion of translation to said member, said eccentric, member and pins on said rods preventing said first spool-member from rotating on said crankpin during operation of said engine.

13. A connecting rod assembly for a crankshaft crankpin, said assembly comprising an annular member journaled about said crankpin, a floating ring member, one of said members having an annular surface, a plurality of connecting rods, a slipper element and a knuckle pin for each connecting rod, said slipper elements being engageable with said annular surface on said one member and said knuckle pins being carried by the other of said members.

14. A connecting rod assembly for a crankshaft crankpin, said assembly comprising an annular member journaled about said crankpin, a plurality of connecting rods pivotally connected to said member, and means for restraining said member against rotation about the axis of said crankpin, said means comprising a floating ring having an annular surface and a plurality of members each pivotally connected to one of said connecting rods and slidably engageable with said annular ring surface.

15. A connecting rod assembly for a crankshaft crankpin, said assembly comprising an annular member journaled about said crankpin, a plurality of connecting rods pivotally connected to said member, and means for restraining said member against rotation about the axis of said crankpin, said means comprising a floating ring, and a plurality of members each pivotally connected to one of said connecting rods and engageable with said ring, the pivotal connection of each of said plurality of members with its associated connecting rods being offset from the longitudinal axis of said connecting rods.

16. A connecting rod assembly for a crankshaft crankpin, said assembly comprising an annular member journaled about said crankpin, a plurality of connecting rods pivotally connected to said member, and means for restraining said member against rotation about the axis of said crankpin, said means comprising a floating ring, and a plurality of members each pivotally connected to one of said connecting rods and engageable with said ring, the pivotal connection of each of said plurality of members with its associated connecting rod being offset from the longitudinal axis of said connecting rod in a direction opposite to the direction of rotation of said connecting rod as it passes through its top dead center position.

17. A connecting rod assembly for a crankshaft crankpin, said assembly comprising an annular member journaled about said crankpin, a plurality of floating ring members having annular surfaces, a plurality of connecting rods, a plurality of slipper elements and a knuckle pin for each connecting rod, said slipper elements being respectively engageable with said annular surfaces on said floating members and said knuckle pins being carried by the other of said members.

18. A connecting rod assembly for a crankshaft crankpin, said assembly comprising an annular member journaled about said crankpin, a plurality of connecting rods pivotally connected to said members, and means for restraining said member against rotation about the axis of said crankpin, said means comprising at least two floating rings having annular surfaces, and a plurality of members each pivotally connected to one of said connecting rods and respectively engageable with said annular ring surfaces.

19. A connecting rod assembly for a crankshaft crankpin, said assembly comprising an annular member journaled about said crankpin, a plurality of connecting rods pivotally connected to said member, and means for restraining said member against rotation about the axis of said crankpin, said means comprising a plurality of floating rings, and a plurality of members each pivotally connected to one of said connecting rods and respectively engageable with said rings, the pivotal connection of each of said plurality of members with its associated connecting rods being offset from the longitudinal axis of said connecting rod.

20. A connecting rod assembly for a crankshaft crankpin, said assembly comprising an annular member journaled about said crankpin, a plurality of connecting rods pivotally connected to said member, and means for restraining said member against rotation about the axis of said crankpin, said means comprising two floating rings, one on each side of said connecting rods, and a plurality of members each pivotally connected to one of said connecting rods and engageable with said rings, the pivotal connection of each of said plurality of members with its associated connecting rod being respectively offset from the longitudinal axis of said connecting rod in a direction opposite to the direction of rotation of said connecting rod as it passes through either its top dead center or bottom dead center position respectively.

J. A. H. BARKEIJ.

REFERENCES CITED

The following references are of record in the file of this patent:

UNITED STATES PATENTS

| Number | Name | Date |
|---|---|---|
| 1,991,657 | Chevrolet | Feb. 19, 1935 |
| 2,150,548 | Hill | Mar. 14, 1939 |
| 2,209,014 | Barkeij | July 23, 1940 |
| 2,239 039 | Hill | Apr. 22, 1941 |
| 2,390,623 | Steiner | Dec. 11, 1945 |

FOREIGN PATENTS

| Number | Country | Date |
|---|---|---|
| 511,946 | France | Oct. 2, 1920 |